(12) United States Patent
Liu

(10) Patent No.: US 11,048,118 B1
(45) Date of Patent: Jun. 29, 2021

(54) DISPLAY PANEL AND DISPLAY DEVICE

(71) Applicant: WUHAN CHINA STAR OPTOELECTRONICS TECHNOLOGY CO., LTD, Hubei (CN)

(72) Inventor: Fancheng Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/959,162

(22) PCT Filed: May 6, 2020

(86) PCT No.: PCT/CN2020/088651
§ 371 (c)(1),
(2) Date: Jun. 30, 2020

(30) Foreign Application Priority Data

Feb. 17, 2020 (CN) .......................... 202010095454.7

(51) Int. Cl.
*G02F 1/133* (2006.01)
*G02F 1/13357* (2006.01)
*G02F 1/1362* (2006.01)
*G02F 1/1368* (2006.01)
*G02F 1/1335* (2006.01)

(52) U.S. Cl.
CPC .......... *G02F 1/1336* (2013.01); *G02F 1/1368* (2013.01); *G02F 1/133531* (2021.01); *G02F 1/136222* (2021.01)

(58) Field of Classification Search
CPC .................................................... G02F 1/1336
See application file for complete search history.

(56) References Cited

U.S. PATENT DOCUMENTS

| 2010/0085514 | A1 | 4/2010 | Tsuchiya et al. |
| 2013/0063676 | A1* | 3/2013 | Tsuchihashi ........ G02F 1/13338 349/54 |
| 2017/0123452 | A1* | 5/2017 | Evans, V .......... G02F 1/133305 |
| 2018/0157112 | A1 | 6/2018 | Chong et al. |

FOREIGN PATENT DOCUMENTS

| CN | 101718924 A | 6/2010 |
| CN | 109001935 A | 12/2018 |
| CN | 208737147 U | 4/2019 |
| CN | 110262108 A | 9/2019 |
| CN | 110632789 A | 12/2019 |
| CN | 110646984 A | 1/2020 |
| CN | 110764300 A | 2/2020 |

* cited by examiner

*Primary Examiner* — Sang V Nguyen
(74) *Attorney, Agent, or Firm* — Mark M. Friedman

(57) ABSTRACT

A display panel and a display device. The display panel includes a backlight module, a first polarizer, and a thin film transistor substrate, a liquid crystal layer, a color filter, and a second polarizer are sequentially stacked on the backlight module. A first via hole is defined in the backlight module, and a functional device is disposed in the first via hole. a plurality of first color resists are disposed on a side of the color filter adjacent to the liquid crystal layer, and a third via hole is defined in a portion of the plurality of first color resists corresponding to the first via hole, wherein third polarizers are disposed between the functional device and the color filter and correspond to the first via hole, and a polarization direction of the third polarizer is same as the polarization direction of the second polarizer.

17 Claims, 3 Drawing Sheets

DISPLAY PANEL AND DISPLAY DEVICE

FIELD OF INVENTION

The present disclosure relates to the field of display technologies, and particularly relates to a display panel and a display device.

BACKGROUND OF INVENTION

In recent years, as overall process design capabilities of mobile phones have been improved, so have consumers' preferences been influenced and evolved. Thus, an overall trend of a design direction of mobile phone screens has been to gradually change from a previously diverse selection of designs to a standard full-screen design. Design and process capabilities of full-screen related indicators in display panels, such as chip on flex (COF), ultra-narrow bezel, and notch etc., have seen continuous improvements within a single year, and a screen-to-body occupation ratio of the display panels has gradually increased from 80% to 97%. However, with rapid improvement of the above capabilities, a relative bottleneck period has been reached temporarily, as an in-screen digging technology has come into being. Screen digging technology can further increase the screen occupation ratio and improve aesthetics of the process design of the mobile phones.

In prior art, a liquid crystal display (LCD) device cannot be displayed at a digging hole, so it cannot achieve a 100% screen occupation ratio.

Therefore, the prior art has defects and needs to be improved urgently.

Technical Problems

The present disclosure provides a display panel and a display device, which can display at a digging hole, thereby improving a screen occupation ratio.

Technical Solutions

In a first aspect, an embodiment of the present disclosure provides a display panel including:

A backlight module, wherein a first via hole is defined in the backlight module, and a functional device is disposed in the first via hole; and A first polarizer, a thin film transistor substrate, a liquid crystal layer, a color filter, and a second polarizer are sequentially stacked on the backlight module, wherein a polarization angle of the first polarizer and a polarization angle of the second polarizer are perpendicular to each other, a second via hole is defined in a portion of the first polarizer or the second polarizer corresponding to the first via hole, a plurality of first color resists are disposed on a side of the color filter adjacent to the liquid crystal layer, and a third via hole is defined in a portion of the plurality of first color resists corresponding to the first via hole; and Wherein third polarizers are disposed between the functional device and the color filter and corresponding to the first via hole, and a polarization direction of the third polarizer is same as the polarization direction of the second polarizer.

In the display panel described in the present disclosure, wherein a plurality of second color resists are disposed on a side of the thin film transistor substrate adjacent to the liquid crystal layer, the second color resists are disposed corresponding to the first via hole and spaced from each other, and the third polarizers are disposed corresponding to spaced areas between the second color resists.

In the display panel described in the present disclosure, wherein a fourth polarizer is disposed between the functional device and the color filter and corresponding to the second color resists, the fourth polarizer and the third polarizers are disposed in a same layer, and a polarization direction of the fourth polarizer and the polarization direction of the third polarizers are perpendicular to each other.

In the display panel described in the present disclosure, wherein molybdenum oxide is disposed on bottom of the third polarizers and the fourth polarizer.

In the display panel described in the present disclosure, wherein the fourth polarizer is disposed between the thin film transistor substrate and the liquid crystal layer.

In the display panel described in the present disclosure, wherein the fourth polarizer is disposed between the liquid crystal layer and the color filter.

In the display panel described in the present disclosure, wherein the fourth polarizer is disposed at the second via hole.

In the display panel described in the present disclosure, wherein the fourth polarizer is disposed in the thin film transistor substrate.

In the display panel described in the present disclosure, wherein a horizontal length of the third via hole is greater than a half of a horizontal length of the color filter.

In a second aspect, an embodiment of the present disclosure provides a display device including a housing and a display panel, wherein the display panel is disposed on the housing, and the display panel includes:

A backlight module, wherein a first via hole is defined in the backlight module, and a functional device is disposed in the first via hole; and A first polarizer, a thin film transistor substrate, a liquid crystal layer, a color filter, and a second polarizer are sequentially stacked on the backlight module, wherein a polarization angle of the first polarizer and a polarization angle of the second polarizer are perpendicular to each other, a second via hole is defined in a portion of the first polarizer or the second polarizer corresponding to the first via hole, a plurality of first color resists are disposed on a side of the color filter adjacent to the liquid crystal layer, and a third via hole is defined in a portion of the plurality of first color resists corresponding to the first via hole; and Wherein third polarizers are disposed between the functional device and the color filter and corresponding to the first via hole, and a polarization direction of the third polarizer is same as the polarization direction of the second polarizer.

In the display device described in the present disclosure, wherein a plurality of second color resists are disposed on a side of the thin film transistor substrate adjacent to the liquid crystal layer, the second color resists are disposed corresponding to the first via hole and spaced from each other, and the third polarizers are disposed corresponding to spaced areas between the second color resists.

In the display device described in the present disclosure, wherein a fourth polarizer is disposed between the functional device and the color filter, and corresponding to the second color resists, the fourth polarizer and the third polarizers are disposed in a same layer, and a polarization direction of the fourth polarizer and the polarization direction of the third polarizers are perpendicular to each other.

In the display device described in the present disclosure, wherein molybdenum oxide is disposed on bottom of the third polarizers and the fourth polarizer.

In the display device described in the present disclosure, wherein the fourth polarizer is disposed between the thin film transistor substrate and the liquid crystal layer.

In the display device described in the present disclosure, wherein the fourth polarizer is disposed between the liquid crystal layer and the color filter.

In the display device described in the present disclosure, wherein the fourth polarizer is disposed at the second via hole.

In the display device described in the present disclosure, wherein the fourth polarizer is disposed in the thin film transistor substrate.

In the display device described in the present disclosure, wherein a horizontal length of the third via hole is greater than a half of a horizontal length of the color filter.

In a third aspect, an embodiment of the present disclosure provides a display panel, including:

A backlight module, wherein a first via hole is defined in the backlight module, and a functional device is disposed in the first via hole; and A first polarizer, a thin film transistor substrate, a liquid crystal layer, a color filter, and a second polarizer are sequentially stacked on the backlight module, wherein a polarization angle of the first polarizer and a polarization angle of the second polarizer are perpendicular to each other, a second via hole is defined in a portion of the first polarizer or the second polarizer corresponding to the first via hole, a plurality of first color resists are disposed on a side of the color filter adjacent to the liquid crystal layer, and a third via hole is defined in a portion of the plurality of first color resists corresponding to the first via hole; and wherein third polarizers are disposed between the functional device and the color filter, the third polarizers correspond to the first via hole, and a polarization direction of the third polarizer is same as the polarization direction of the second polarizer, wherein a plurality of second color resists are disposed on a side of the thin film transistor substrate adjacent to the liquid crystal layer, the second color resists are disposed corresponding to the first via hole and spaced from each other, and the third polarizers are disposed corresponding to spaced areas between the second color resists, and a horizontal length of the third via hole is greater than a half of a horizontal length of the color filter.

Beneficial Effects

The display panel provided in an embodiment of the present disclosure includes a backlight module and a first polarizer, a thin film transistor substrate, a liquid crystal layer, a color filter, and a second polarizer sequentially stacked on the backlight module. A first via hole is defined in the backlight module, and a functional device is disposed in the first via hole. A polarization angle of the first polarizer and a polarization angle of the second polarizer are perpendicular to each other. A second via hole is defined in a portion of the first polarizer or the second polarizer corresponding to the first via hole. A plurality of first color resists are disposed on a side of the color filter adjacent to the liquid crystal layer, and a third via hole is defined in a portion of the plurality of first color resists corresponding to the first via hole. Wherein, third polarizers are disposed between the functional device and the color filter, the third polarizers correspond to the first via hole, and a polarization direction of the third polarizer is same as the polarization direction of the second polarizer. The display panel can be displayed at digging holes to increase a screen occupation ratio.

DESCRIPTION OF DRAWINGS

Following describes specific implementations of the present disclosure in detail with reference to accompanying drawings, which will make the technical solutions and other beneficial effects of the present disclosure obvious.

DETAILED DESCRIPTION OF EMBODIMENTS

An embodiment of the present disclosure provides a display device including a housing and a display panel, wherein the display panel is disposed on the housing, and the display panel includes:

A backlight module, wherein a first via hole is defined in the backlight module, and a functional device is disposed in the first via hole; and A first polarizer, a thin film transistor substrate, a liquid crystal layer, a color filter, and a second polarizer sequentially stacked on the backlight module, wherein a polarization angle of the first polarizer and a polarization angle of the second polarizer are perpendicular to each other, a second via hole is defined in a portion of the first polarizer or the second polarizer corresponding to the first via hole, a plurality of first color resists are disposed on a side of the color filter adjacent to the liquid crystal layer, and a third via hole is defined in a portion of the plurality of first color resists corresponding to the first via hole; and Wherein third polarizers are disposed between the functional device and the color filter and corresponding to the first via hole, and a polarization direction of the third polarizer is same as the polarization direction of the second polarizer.

Wherein a plurality of second color resists are disposed on a side of the thin film transistor substrate adjacent to the liquid crystal layer, the second color resists are disposed corresponding to the first via hole and spaced from each other, and the third polarizers are disposed corresponding to spaced areas between the second color resists.

Wherein a fourth polarizer is disposed between the functional device and the color filter and corresponding to the second color resists, the fourth polarizer and the third polarizers are disposed in a same layer, and a polarization direction of the fourth polarizer and the polarization direction of the third polarizers are perpendicular to each other.

Wherein molybdenum oxide is disposed on bottom of the third polarizers and the fourth polarizer.

Wherein the fourth polarizer is disposed between the thin film transistor substrate and the liquid crystal layer.

Wherein the fourth polarizer is disposed between the liquid crystal layer and the color filter.

Wherein the fourth polarizer is disposed at the second via hole.

Wherein the fourth polarizer is disposed in the thin film transistor substrate.

Wherein a horizontal length of the third via hole is greater than half of a horizontal length of the color filter.

Figure 1:
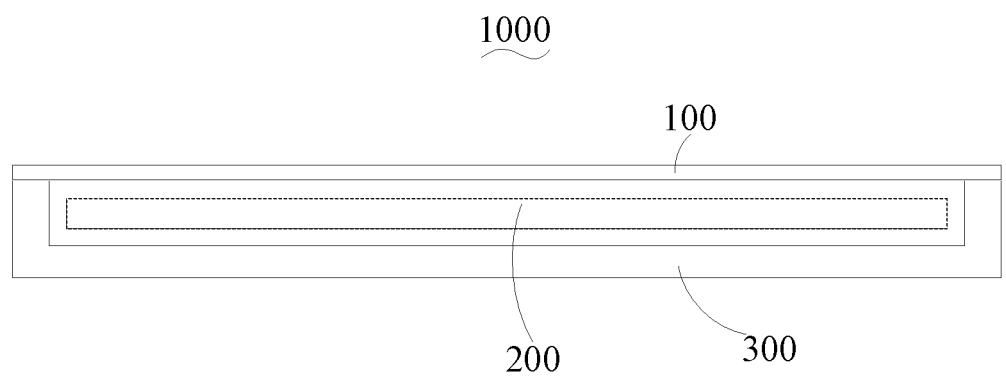
FIG. 1 is a structural schematic view of a display device according to an embodiment of the present disclosure.

Referring to FIG. 1, it is a schematic view of a display device 1000 according to an embodiment of the present disclosure. A display device 100 may include the display panel 100, a control circuit 200, and a housing 300. It should be noted that the display device 1000 shown in FIG. 1 is not limited to the above, and it may also include other devices, such as a camera, an antenna structure, and a pattern unlocking module.

Wherein, the display panel 100 is disposed on the housing 300.

In some embodiments, the display panel 100 may be fixed to the housing 300, and the display panel 100 and the housing 300 form a closed space to accommodate devices such as the control circuit 200.

In some embodiments, the housing 300 may be made of a flexible material, such as a plastic housing or a silicone housing.

Wherein, the control circuit 200 is installed in the housing 300. The control circuit 200 may be the main board of the display device 1000. The control circuit 200 may be integrated with one, two, or more functional components such as batteries, antenna structures, microphones, speakers, headphone jacks, universal serial bus interfaces, cameras, range sensors, ambient light sensors, receivers, and processors, and etc.

Wherein, the display panel 100 is installed in the housing 300. Meanwhile, the display panel 100 is electrically connected to the control circuit 200 to form a display surface of the display device 1000. The display panel 100 may include a display area and a non-display area. The display area can be used to display images of the display device 1000 or be used for touch manipulation. The non-display area can be used to set various functional components.

An embodiment of the present disclosure provides a display panel including:

A backlight module, wherein a first via hole is defined in the backlight module, and a functional device is disposed in the first via hole; and The first polarizer, the thin film transistor substrate, the liquid crystal layer, the color filter, and the second polarizer are sequentially stacked on the backlight module, wherein a polarization angle of the first polarizer and a polarization angle of the second polarizer are perpendicular to each other, the second via hole is defined in the portion of the first polarizer or the second polarizer corresponding to the first via hole, the plurality of first color resists are disposed on the side of the color filter adjacent to the liquid crystal layer, and the third via hole is defined in a portion of the plurality of first color resists corresponding to the first via hole; and Wherein third polarizers are disposed between the functional device and the color filter and corresponding to the first via hole, and a polarization direction of the third polarizer is same as the polarization direction of the second polarizer.

Wherein a plurality of second color resists are disposed on a side of the thin film transistor substrate adjacent to the liquid crystal layer, the second color resists are disposed corresponding to the first via hole and spaced from each other, and the third polarizers are disposed corresponding to spaced areas between the second color resists.

Wherein a fourth polarizer is disposed between the functional device and the color filter and corresponding to the second color resists, the fourth polarizer and the third polarizers are disposed in a same layer, and a polarization direction of the fourth polarizer and the polarization direction of the third polarizers are perpendicular to each other.

Wherein molybdenum oxide is disposed on the bottom of the third polarizers and the fourth polarizer.

Wherein the fourth polarizer is disposed between the thin film transistor substrate and the liquid crystal layer.

Wherein the fourth polarizer is disposed between the liquid crystal layer and the color filter.

Wherein the fourth polarizer is disposed at the second via hole.

Wherein the fourth polarizer is disposed in the thin film transistor substrate.

Wherein the horizontal length of the third via hole is greater than half of a horizontal length of the color filter.

Figure 2:
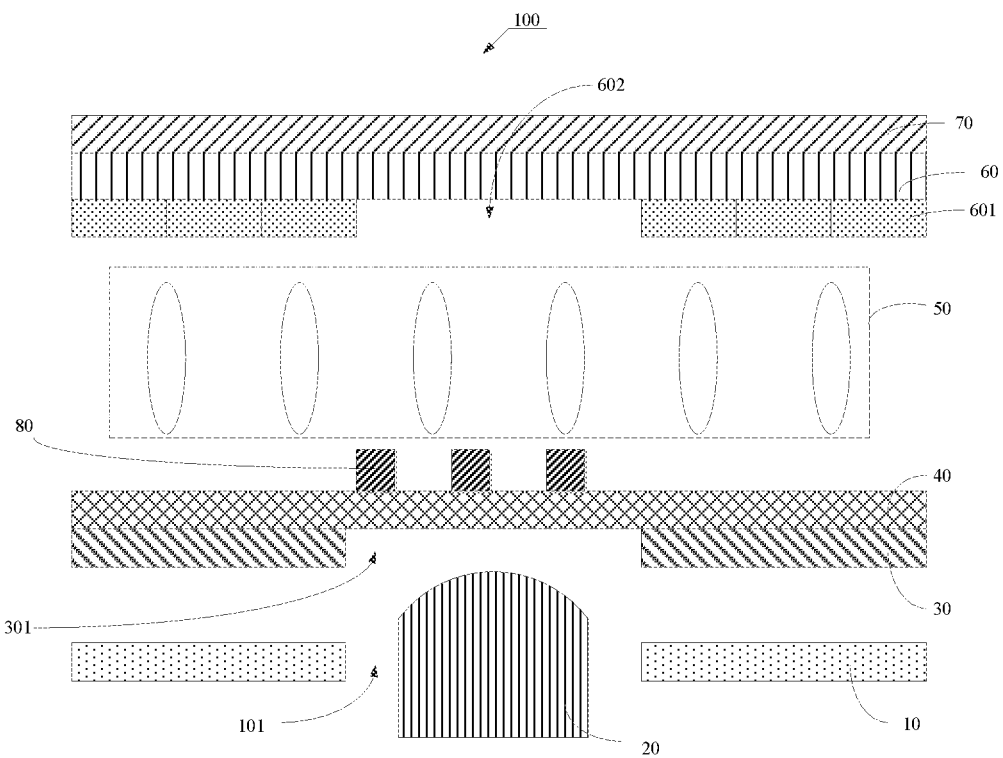
FIG. 2 is a first structural schematic view of a display panel according to an embodiment of the present disclosure.

Referring to FIG. 2, it is a first schematic view of a display panel according to an embodiment.

An embodiment of the present disclosure provides a display panel 100 including:

A backlight module 10, wherein a first via hole 101 is defined in the backlight module 10, and a functional device 20 is disposed at the first via hole 101; and A first polarizer 30, a thin film transistor substrate 40, a liquid crystal layer 50, a color filter 60, and a second polarizer 70 sequentially stacked on the backlight module 10, wherein a polarization angle of the first polarizer 30 and a polarization angle of the second polarizer 70 are perpendicular to each other, a second via hole is defined in a portion of the first polarizer 30 or the second polarizer 70 corresponding to the first via hole 101, a plurality of first color resists 601 are disposed on a side of the color filter 60 adjacent to the liquid crystal layer 50, and a third via hole 602 is defined in a portion of the plurality of first color resists 601 corresponding to the first via hole 101; and Wherein third polarizers 80 are disposed between the functional device and the color filter 60 and corresponding to the first via hole 101, and a polarization direction of the third polarizer 80 is same as the polarization direction of the second polarizer 70.

Specifically, the backlight module 10 may be any one of a direct type backlight module or an edge type backlight module, which is not limited here. There is a first via hole 101 defined in the backlight module 10. A functional device 20 is provided at the first via hole 101. Wherein, the functional device 20 may be a functional device such as a camera module, a light sensor, a range sensor, and other devices of similar function.

Wherein the polarization angle of the first polarizer 30 and the polarization angle of the second polarizer 70 are perpendicular to each other, so that when the display panel 100 is powered on, rotation of the liquid crystal branches in the liquid crystal layer 50 is controlled by an electric field, thereby changing a light travel direction. In addition, a color filter 60 is disposed on the liquid crystal layer 50, and a plurality of first color resists 601 are disposed on the side of the color filter 60 close to the liquid crystal layer 50. After light emitted from the backlight module 10 passes through the liquid crystal layer 50, different colors of light are generated through the first color resist 601, and color of the first color resist 601 may be any one of red, green, blue, and white. Taking the first color resist 601 as red as an example, when the light passes through the red first color resist 601, the emitted light is red.

Referring to FIG. 2, FIG. 2 shows that a second via hole 301 is defined in the first polarizer 30. When the second via hole 301 is defined in the first polarizer 30, since polarizers need to be disposed on both sides of the liquid crystal layer 50 to control twisting of liquid crystals in the liquid crystal layer 50, it is necessary to dispose a third polarizer 80 between the liquid crystal layer 50 and the functional device 20 (for example, a third polarizer 80 is disposed between the first polarizer 30 and the thin film transistor substrates 40, or a third polarizer 80 is disposed inside the thin film transistor substrate 40 and corresponding to the second via hole 301), so that the liquid crystals in the liquid crystal layer 50 controlled by the third polarizer 80 and the second polarizer 70 twist. Power supply of the display panel 100 is divided into a via hole area and a non-via hole area that are independently controlled. For example, if the functional device 20 is the camera module, when the camera module is shooting, since a portion of the color filter 60 corresponding to the first via hole 101 is not disposed with the first color resist 601, while power is supplied to the via hole area, light emitted by the backlight module 10 does not pass through the first color resist 601 after passing through the liquid crystal layer 50, so the via hole area merely supports a black and white display. The color filter 60 corresponding to the first via hole 101 is not provided with the first color resist 601, so amount of light entering the camera module is increased, and imaging quality is enhanced.

Figure 3:
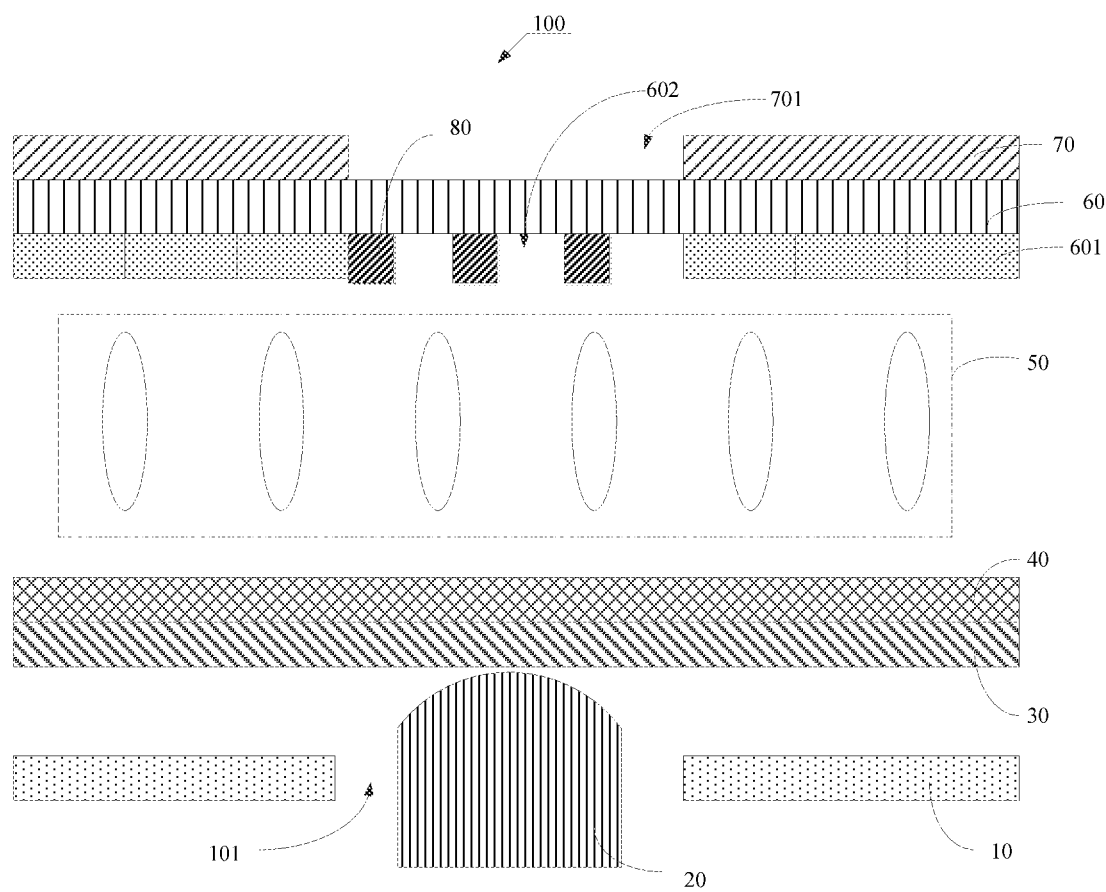
FIG. 3 is a second structural schematic view of a display panel according to an embodiment of the present disclosure.

Referring to FIG. 3, FIG. 3 is a second schematic view of a display panel according to an embodiment. FIG. 3 shows that a second via hole 701 is defined in the second polarizer 70. When the second polarizer 70 is provided with the second via hole 701 defined thereon, since polarizers need to be disposed on both sides of the liquid crystal layer 50 to control the twisting of the liquid crystals, a third polarizer 80 needs to be disposed between the liquid crystal layer 50 and the color filter 60, so that the liquid crystals in the liquid crystal layer 50 controlled by the third polarizer 80 and the first polarizer 30 reverse. FIG. 3 shows that the third polarizer 80 is disposed at the third via hole 602. Similarly, the via hole area only supports black and white display, the color filter 60 corresponding to the first via hole 101 is not provided with the first color resister 601, so the amount of light entering the camera module is increased, and the imaging quality is enhanced.

Figure 4:
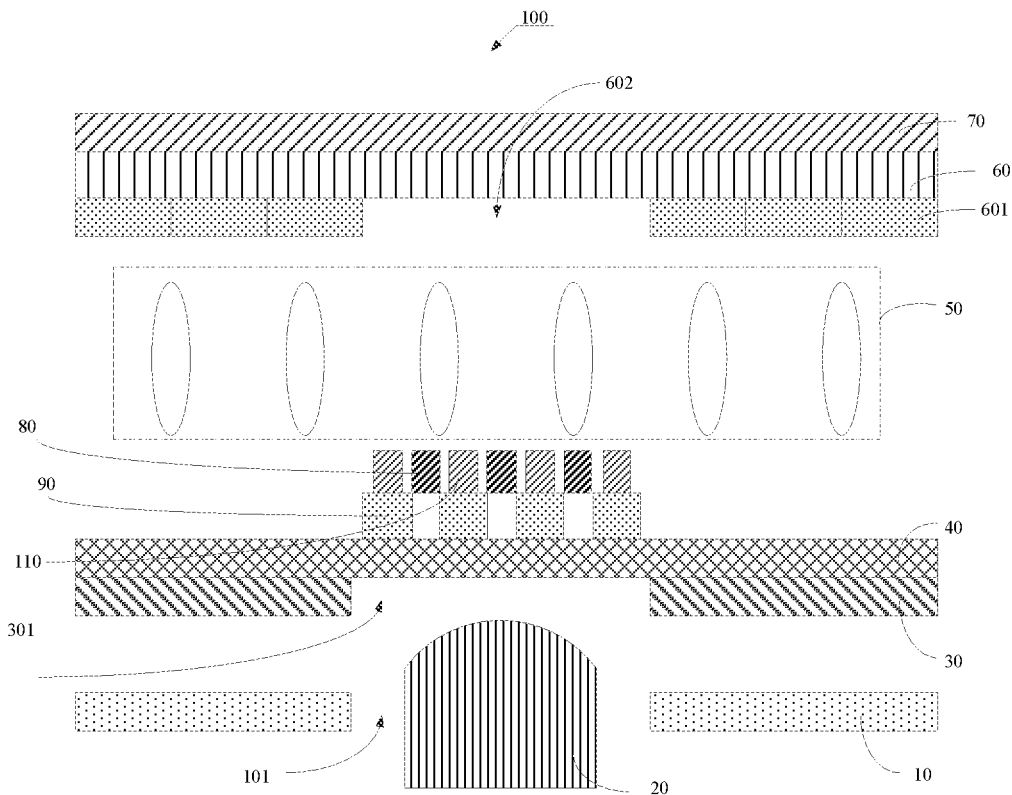
FIG. 4 is a third structural schematic view of a display panel according to an embodiment of the present disclosure.

In some embodiments, referring to FIG. 4, FIG. 4 is a second schematic view of a display panel according to an embodiment. In order to supply color display at the via hole area, a plurality of second color resists 90 may be disposed at intervals on a side of the thin film transistor substrate 40 adjacent to the liquid crystal layer 50, and the second color resists 90 are disposed to be corresponding to the first via hole 101, and the third polarizer 80 may be opposite set at intervals. A fourth polarizer 110 is disposed between the functional device 20 and the color filter 60 and corresponds to the plurality of second color resists 90, the fourth polarizer 110 and the third polarizer 80 are disposed in a same layer, and a polarization direction of the fourth polarizer 110 and a polarization direction of the third polarizer 80 are perpendicular to each other.

Figure 5:
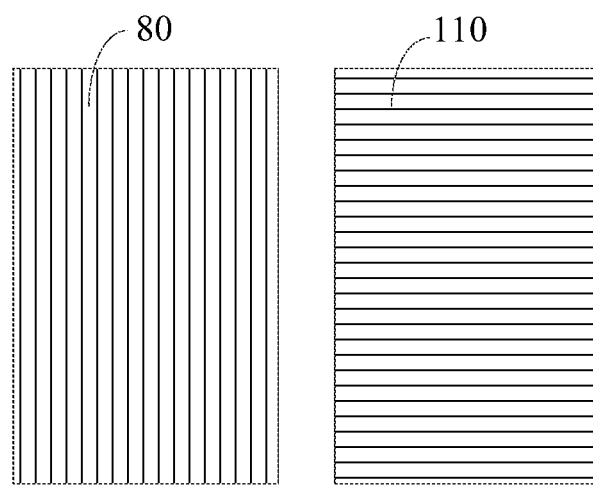
FIG. 5 is a plan view of a third polarizer and a fourth polarizer according to an embodiment of the present disclosure.

Referring to FIG. 5, FIG. 5 is a plan view of the third polarizer and the fourth polarizer according to an embodiment. It can be seen that the polarizing directions of the third polarizer 80 and the fourth polarizer 110 are perpendicular to each other. In a manufacturing process, the third polarizer 80 and the fourth polarizer 110 whose polarized light directions are perpendicular to each other as shown in FIG. 5 can be manufactured through a nanoimprint process.

In the example wherein the functional device 20 is the camera module, in a non-photographing state: the non-via hole area is powered to normally display, the via hole area is powered, an area of the via hole area where the second color resister 90 is correspondingly disposed is powered to display, and the area of the via hole area which corresponds to intervals of the second color resister 90 is black, since the polarization angle of the fourth polarizer 110 is perpendicular to the polarization angle of the first polarizer 30 and is parallel to the polarization angle of the second polarizer 70, the area of the via hole area covered by the second color resister 90 is powered to display a black image; and in a shooting state: the non-via hole area is powered to normally display, the via hole area is not powered, the area covered by the second color resister 90 is black, and an uncovered area is white, the area of the via hole area covered by the second color resister 90 is in a black state due to the same polarization angle as the non-via hole area, while the area not covered by the second color resister 90 is in the white state. In addition, the area of the via hole area corresponding to the second color resister 90 does not transfer light, so it does not affect imaging of the camera module. When large-angle light in the non-via hole area enters the via hole area obliquely, it will be absorbed by the second color resister 90 in the adjacent via hole area, thereby relieving an effect of the large-angle light in the non-via hole area on imaging quality of the camera module.

In some embodiments, molybdenum oxide is disposed on bottom of the third polarizers 80 and the fourth polarizer 110.

Specifically, in order to relieve effect of reflected light of the third polarizer 80 and the fourth polarizer 110 on the imaging of the camera module, the bottom of the third polarizer 80 and the fourth polarizer 110 near the functional device 20 may be plated with a black metal, such as molybdenum oxide (MoOx), etc., and a reflectance value is reduced to less than 5%.

In some embodiments, a horizontal length of the third via hole 602 is greater than half of a horizontal length of the color filter 60.

In some embodiments, the fourth polarizer 110 is disposed between the thin film transistor substrate 40 and the liquid crystal layer 50.

In some embodiments, the fourth polarizer 110 is disposed between the liquid crystal layer 50 and the color filter 60.

In some embodiments, the fourth polarizer 110 is disposed at the second via hole.

In some embodiments, the fourth polarizer 110 is disposed in the thin film transistor substrate 40.

Wherein, when the third polarizer 80 and the fourth polarizer 110 are disposed on the color filter 60 or the thin film transistor substrate 40, a transparent layer may be added in a vacant area of a same layer with the first color resist 601 and the second color resist 90, so as to strengthen overall strength of the display panel 100.

The display panel 100 provided in an embodiment of the present disclosure includes a backlight module 10 and a first polarizer 30, a thin film transistor substrate 40, a liquid crystal layer 50, a color filter 60, and a second polarizer 70 are sequentially stacked on the backlight module 10. Wherein a first via hole 101 is defined in the backlight module 10, and a functional device 20 is disposed in the first via hole 101. A polarization angle of the first polarizer 30 and a polarization angle of the second polarizer 70 are perpendicular to each other, a second via hole is defined in a portion of the first polarizer 30 or the second polarizer 70 corresponding to the first via hole 101, a plurality of first color resists 601 are disposed on a side of the color filter 60 adjacent to the liquid crystal layer 50, and a third via hole 602 is defined in a portion of the plurality of first color resists 601 corresponding to the first via hole 101. Wherein third polarizers 80 are disposed between the functional device and the color filter 60 and corresponding to the first via hole 101, and a polarization direction of the third polarizer 80 is same as the polarization direction of the second polarizer 70. The display panel can display at digging holes, thereby increasing the screen ratio. An embodiment of the present disclosure further provides a display panel including:

A backlight module, wherein a first via hole is defined in the backlight module, and a functional device is disposed in the first via hole; and A first polarizer, a thin film transistor substrate, a liquid crystal layer, a color filter, and a second polarizer are sequentially stacked on the backlight module, wherein a polarization angle of the first polarizer and a polarization angle of the second polarizer are perpendicular to each other, a second via hole is defined in a portion of the first polarizer or the second polarizer corresponding to the first via hole, a plurality of first color resists are disposed on a side of the color filter adjacent to the liquid crystal layer, and a third via hole is defined in a portion of the plurality of first color resists corresponding to the first via hole; and wherein third polarizers are disposed between the functional device and the color filter, the third polarizers correspond to the first via hole, and a polarization direction of the third polarizer is same as the polarization direction of the second polarizer, wherein a plurality of second color resists are disposed on a side of the thin film transistor substrate adjacent to the liquid crystal layer, the second color resists are disposed corresponding to the first via hole and spaced from each other, and the third polarizers are disposed corresponding to spaced areas between the second color resists, and a horizontal length of the third via hole is greater than half of a horizontal length of the color filter.

In the above embodiments, description of each embodiment has its own emphasis. For a part that is not detailed in an embodiment, you can refer to related descriptions in other embodiments.

The embodiments of the present disclosure are described in detail above, and specific examples are used in this article to explain the principles and implementation of the present disclosure. The descriptions of the above embodiments are merely used to help understand the technical solutions and core ideas of the present disclosure; Those of ordinary skill should understand that they can still modify the technical solutions described in the foregoing embodiments, or equivalently replace some of the technical features; and these modifications or replacements do not deviate from the essence of the corresponding technical solutions. The scope of the technical solution of each embodiment.

What is claimed is:

1. A display panel, comprising:
    a backlight module, wherein a first via hole is defined in the backlight module, and a functional device is disposed in the first via hole; and
    a first polarizer, a thin film transistor substrate, a liquid crystal layer, a color filter, and a second polarizer sequentially stacked on the backlight module;
    wherein a polarization angle of the first polarizer and a polarization angle of the second polarizer are perpendicular to each other, a second via hole is defined in a portion of the first polarizer or the second polarizer corresponding to the first via hole, a plurality of first color resists are disposed on a side of the color filter adjacent to the liquid crystal layer, and a third via hole is defined in a portion of the plurality of first color resists corresponding to the first via hole;
    wherein a plurality of second color resists are disposed on a side of the thin film transistor substrate adjacent to the liquid crystal layer, the second color resists are disposed in spaces corresponding to the first via hole; and
    wherein third polarizers are disposed between the functional device and the color filter and corresponding to the first via hole, a polarization direction of the third polarizer is same as a polarization direction of the second polarizer, and the third polarizers are disposed in the spaces corresponding to the second color resists.

2. The display panel in claim 1, wherein a fourth polarizer is disposed between the functional device and the color filter and corresponding to the second color resists, the fourth polarizer and the third polarizers are disposed in a same layer, and a polarization direction of the fourth polarizer and the polarization direction of the third polarizers are perpendicular to each other.

3. The display panel in claim 2, wherein molybdenum oxide is disposed on a bottom of the third polarizers and the fourth polarizer.

4. The display panel in claim 2, wherein the fourth polarizer is disposed between the thin film transistor substrate and the liquid crystal layer.

5. The display panel in claim 2, wherein the fourth polarizer is disposed between the liquid crystal layer and the color filter.

6. The display panel in claim 2, wherein the fourth polarizer is disposed at the second via hole.

7. The display panel in claim 2, wherein the fourth polarizer is disposed in the thin film transistor substrate.

8. The display panel in claim 1, wherein a horizontal length of the third via hole is greater than half of a horizontal length of the color filter.

9. A display device, comprising a housing and a display panel, wherein the display panel is disposed on the housing, and the display panel comprises:
    a backlight module, wherein a first via hole is defined in the backlight module, and a functional device is disposed in the first via hole; and
    a first polarizer, a thin film transistor substrate, a liquid crystal layer, a color filter, and a second polarizer are sequentially stacked on the backlight module;
    wherein a polarization angle of the first polarizer and a polarization angle of the second polarizer are perpendicular to each other, a second via hole is defined in a portion of the first polarizer or the second polarizer corresponding to the first via hole, a plurality of first color resists are disposed on a side of the color filter adjacent to the liquid crystal layer, and a third via hole is defined in a portion of the plurality of first color resists corresponding to the first via hole;
    wherein a plurality of second color resists are disposed on a side of the thin film transistor substrate adjacent to the liquid crystal layer, the second color resists are disposed in spaces corresponding to the first via hole; and
    wherein third polarizers are disposed between the functional device and the color filter and corresponding to the first via hole, and a polarization direction of the third polarizer is same as the polarization direction of the second polarizer, and the third polarizers are disposed to the spaces corresponding to the second color resists.

10. The display device in claim 9, wherein a fourth polarizer is disposed between the functional device and the color filter, and corresponding to the second color resists, the fourth polarizer and the third polarizers are disposed in a same layer, and a polarization direction of the fourth polarizer and the polarization direction of the third polarizers are perpendicular to each other.

11. The display device in claim 10, wherein molybdenum oxide is disposed on bottom of the third polarizers and the fourth polarizer.

12. The display device in claim 10, wherein the fourth polarizer is disposed between the thin film transistor substrate and the liquid crystal layer.

13. The display device in claim 10, wherein the fourth polarizer is disposed between the liquid crystal layer and the color filter.

14. The display device in claim 10, wherein the fourth polarizer is disposed at the second via hole.

15. The display device in claim 10, wherein the fourth polarizer is disposed in the thin film transistor substrate.

16. The display device in claim 9, wherein a horizontal length of the third via hole is greater than a half of a horizontal length of the color filter.

17. A display panel, comprising:
a backlight module, wherein a first via hole is defined in the backlight module, and a functional device is disposed in the first via hole; and
a first polarizer, a thin film transistor substrate, a liquid crystal layer, a color filter, and a second polarizer are sequentially stacked on the backlight module;
wherein a polarization angle of the first polarizer and a polarization angle of the second polarizer are perpendicular to each other, a second via hole is defined in a portion of the first polarizer or the second polarizer corresponding to the first via hole, a plurality of first color resists are disposed on a side of the color filter adjacent to the liquid crystal layer, and a third via hole is defined in a portion of the plurality of first color resists corresponding to the first via hole;
wherein third polarizers are disposed between the functional device and the color filter, the third polarizers correspond to the first via hole, and a polarization direction of the third polarizer is same as the polarization direction of the second polarizer; and
wherein a plurality of second color resists are disposed on a side of the thin film transistor substrate adjacent to the liquid crystal layer, the second color resists are disposed corresponding to the first via hole and spaced from each other, the third polarizers are disposed corresponding to spaced areas between the second color resists, and a horizontal length of the third via hole is greater than a half of a horizontal length of the color filter.

* * * * *